F. G. HULTENHEIM.
FLUID BRAKE FOR MOTOR VEHICLES.
APPLICATION FILED MAY 8, 1918.
1,338,302.
Patented Apr. 27, 1920.
3 SHEETS—SHEET 3.
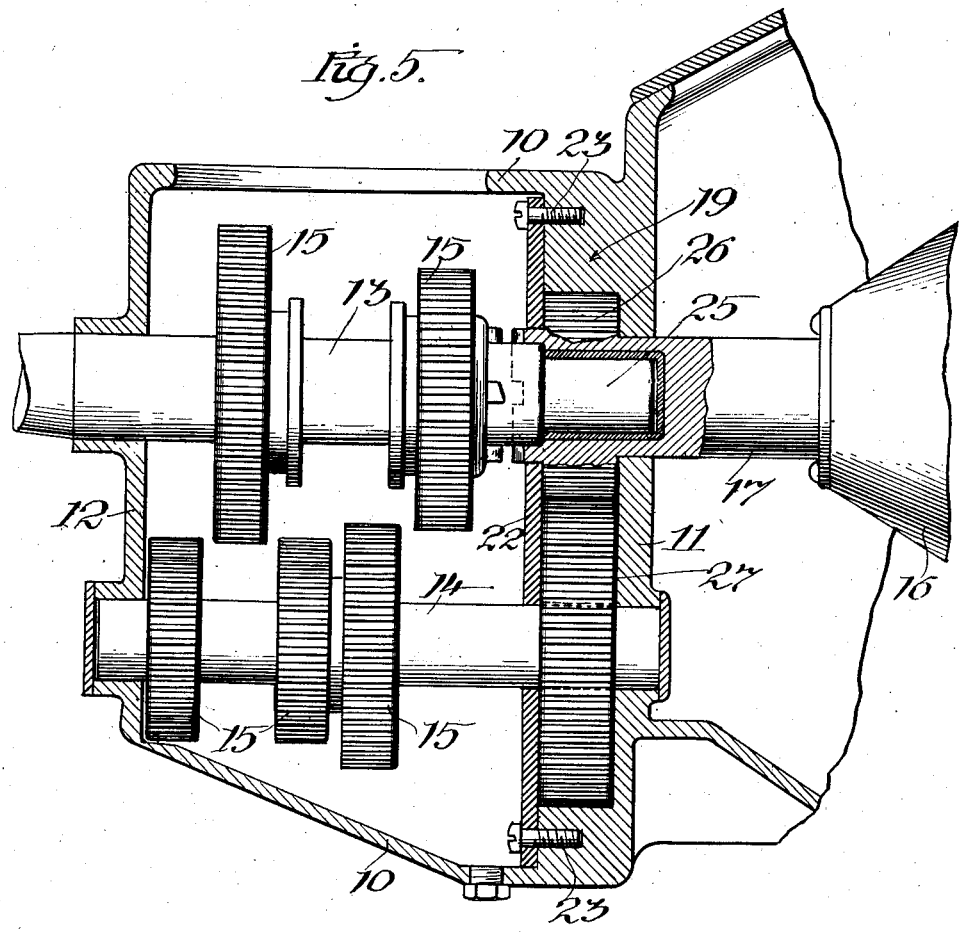
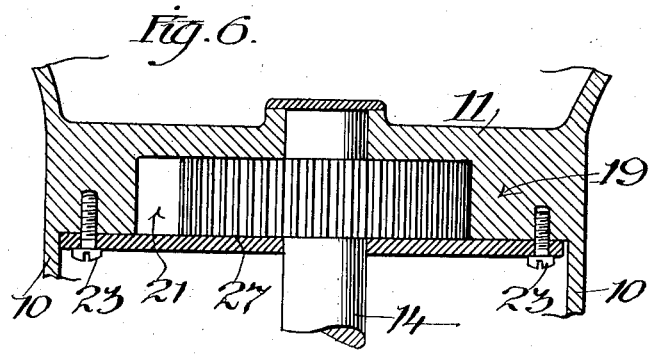
Inventor
F. G. Hultenheim
By Lacey & Lacey, Attorneys

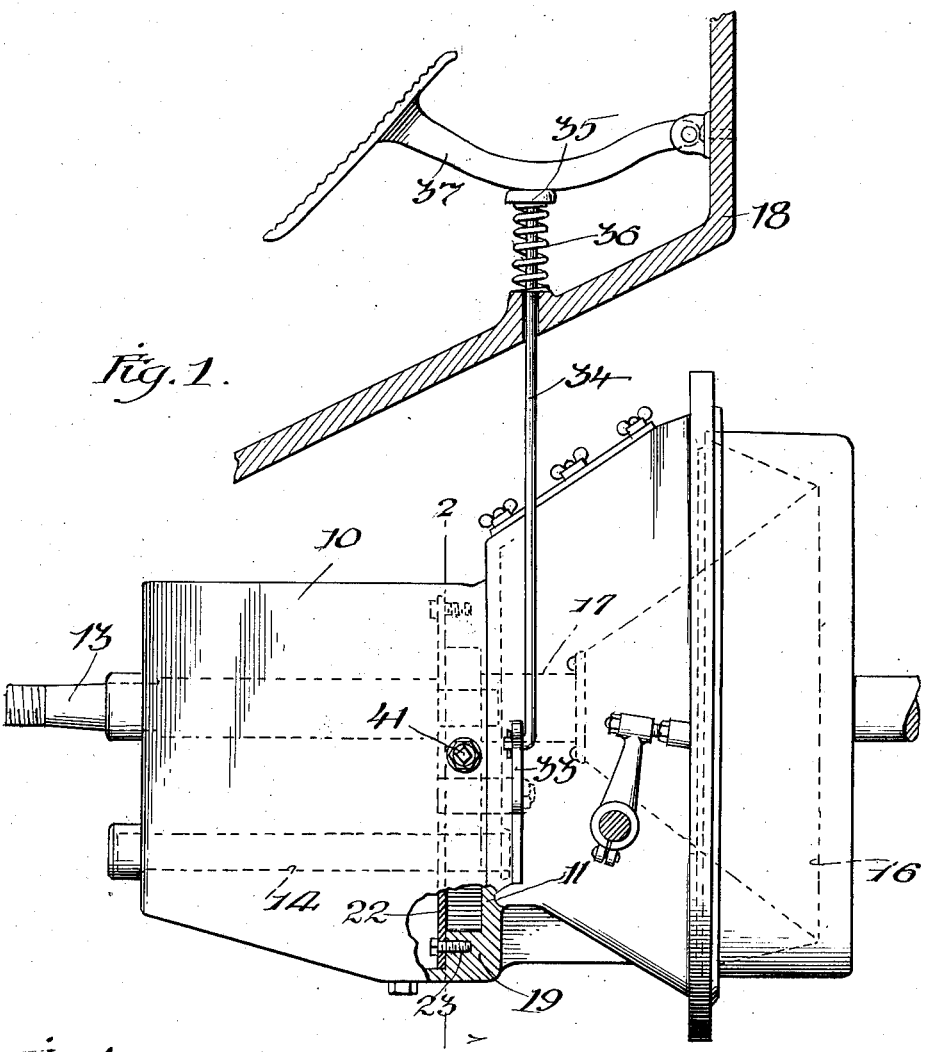

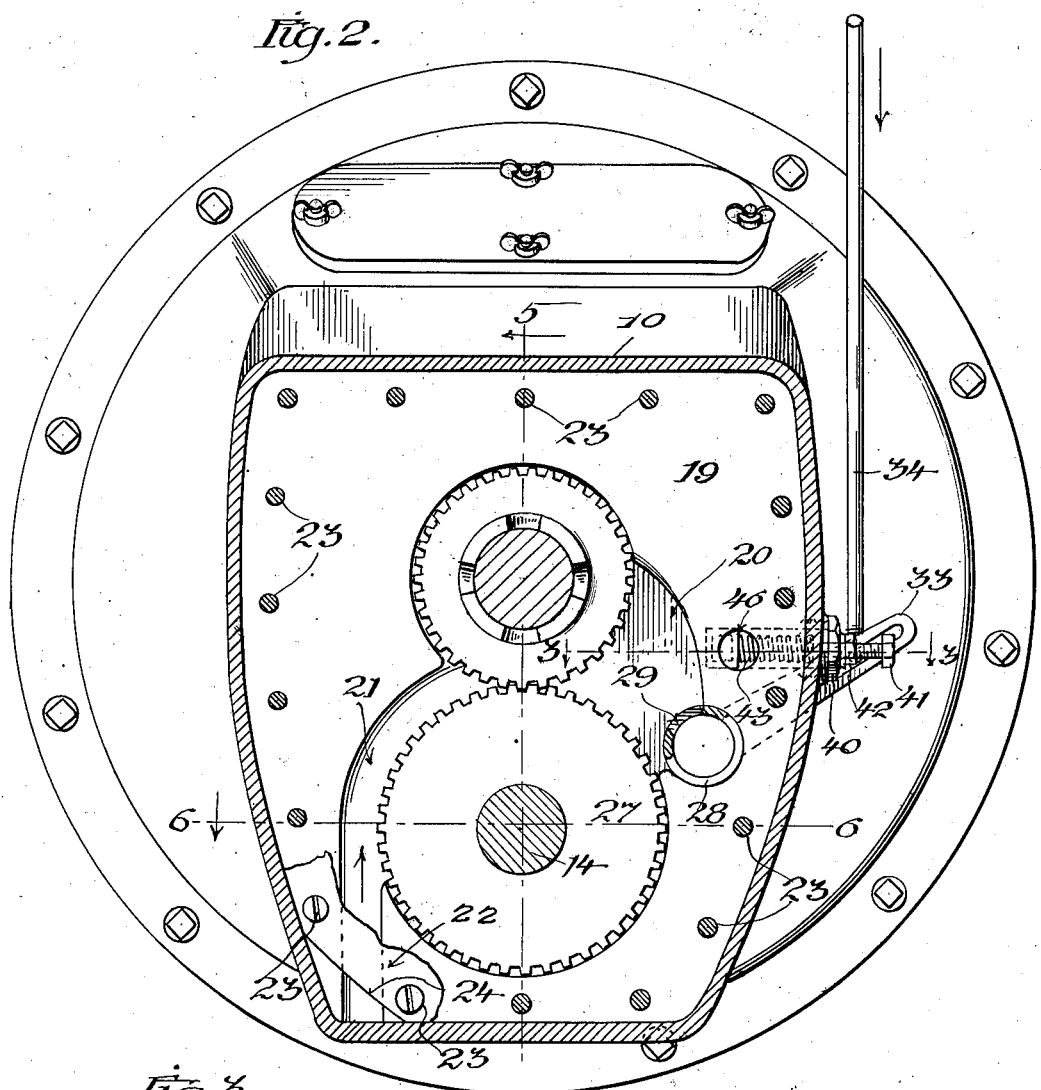

UNITED STATES PATENT OFFICE.

FREDRIK G. HULTENHEIM, OF SAN FRANCISCO, CALIFORNIA.

FLUID-BRAKE FOR MOTOR-VEHICLES.

1,338,302.   Specification of Letters Patent.   Patented Apr. 27, 1920.

Application filed May 8, 1918. Serial No. 233,214.

*To all whom it may concern:*

Be it known that I, FREDRIK G. HULTENHEIM, a subject of the King of Sweden, residing at San Francisco, in the county of San Francisco and State of California, have invented certain new and useful Improvements in Fluid-Brakes for Motor-Vehicles, of which the following is a specification.

This invention relates to an improved fluid brake for motor vehicles and has as its primary object to provide a device of this character wherein fluid resistance will be brought to bear upon the propeller shaft of the vehicle for braking the vehicle.

The invention has as a further object to provide a device of this character wherein the fluid resistance will be under the control of a throttle valve which may be operated at will for varying such resistance to brake the vehicle accordingly.

The invention has as a still further object to provide an arrangement wherein the fluid will be trapped to act upon the propeller shaft and wherein a safety valve will be employed for releasing the trapped fluid at a predetermined pressure.

And the invention has as a still further object to provide a construction wherein the brake will be built into the transmission case of the vehicle and will employ the lubricant therein as a fluid for braking the vehicle.

Other and incidental objects will appear as the description proceeds, and in the drawings wherein I have illustrated the preferred embodiment of the invention, and wherein similar reference characters designate corresponding parts throughout the several views:

Figure 1 is a fragmentary side elevation showing a conventional type of motor vehicle transmission case and associated parts with my improved brake applied thereto, a portion of the vehicle body being shown in section to illustrate the mounting of the foot lever controlling the throttle valve of the brake.

Fig. 2 is a vertical sectional view taken on the line 2—2 of Fig. 1 and looking in the direction of the arrows, this view particularly illustrating the mounting of the pump gears of the brake.

Fig. 3 is a fragmentary transverse sectional view taken on the line 3—3 of Fig. 2 and looking in the direction of the arrows, this view particularly showing the construction of the safety valve of the brake, as well as the mounting of the throttle valve.

Fig. 4 is a detail perspective view showing the throttle valve detached.

Fig. 5 is a vertical sectional view particularly illustrating the mounting of the pump gears within the transmission case, and Fig. 6 is a fragmentary horizontal sectional view taken on the line 6—6 of Fig. 2, particularly showing the intake passage leading to the pump chamber of the brake.

In order that the construction, mounting and operation of my improved brake may be accurately understood, I have, in the drawings, shown the device in connection with a conventional type of motor vehicle transmission. Generally stated, this transmission includes a transmission case 10 having front and rear walls 11 and 12 respectively, through which is journaled a drive shaft 13. Parallel to this shaft is arranged a countershaft 14 and mounted upon these shafts are the coacting speed gears 15. As is well known, the case 10 is filled with a suitable lubricating oil for lubricating these gears. Housed within the forward portion of the transmission case is a clutch indicated at 16, and extending from the clutch is the clutch shaft 17 disposed axially of the drive shaft 13 and journaling the adjacent end thereof. That portion of the vehicle body immediately above the transmission case is indicated at 18.

Coming now more particularly to the subject of the present invention, I thicken the front wall 11 of the transmission case to provide a pump case 19 in which is formed, as particularly shown in Fig. 2 of the drawings, a pump chamber 20 having an intake passage 21 communicating therewith and leading downwardly from the pump chamber to one corner of the pump case. Closing the pump chamber as well as the said passage throughout the greater portion of its length is a plate 22 seating flat against the inner side face of the pump case and freely receiving the shaft 13 therethrough as well as the inner terminal of the clutch shaft 17. The plate 22 is removably secured in position by a plurality of bolts or other suitable fastening devices 23 and is, as particularly shown in Fig. 2, cut away at one of its lower corners, as indicated at 24, to provide an intake opening for the passage 21. The usual speed gear which is upon the rear terminal of the clutch shaft is indicated at 26. This gear is received within the upper portion of the pump chamber 20 to rotate therein. Also the usual speed gear which is generally splined or feathered upon the forward terminal of the countershaft 14 is indicated at 27. This latter gear is received within the lower portion of the pump case and, of course, coöperates with the gear 26, these gears being the fixed reduction gears of the transmission. The gears 26 and 27 are utilized as pump gears and, as particularly brought out in Figs. 2 and 5, are snugly received within the pump chamber at the inner side of the closure plate 22 while the intake passage 21 opens into the pump chamber at one side of the said gears in a plane coincident with their point of contact. Consequently, when the clutch shaft 17 is rotated in the usual manner from the clutch 16, the gear 26 will be rotated to simultaneously rotate the gear 27, causing these gears to create a suction within the pump chamber tending to draw in lubricant from the bottom portion of the transmission case through the passage 21 and into the said chamber.

Rotatably fitted through the pump case is a throttle valve 28 entering the pump chamber 20 at the side thereof opposite the passage 21 and extending freely through the closure plate 22. This valve is, as shown in detail in Fig. 4 of the drawings, formed with a hollow cylindrical body open at its inner end to communicate with the transmission case and is provided in the wall thereof with an opening 29 adapted to be brought into communication with the pump chamber upon rotation of the valve. The valve body is closed at its outer end and is formed with an annular radial flange 30 confronting the forward face of the wall 11 and held to seat thereagainst by screws or other suitable fastening devices 31 engaged in the said wall for thus rotatably supporting the valve in position. Formed on the valve body at its outer end is a squared terminal 32 over which is engaged a valve lever 33 projecting, as particularly shown in Fig. 1, through a suitable slot in the adjacent side wall of the forward portion of the transmission case. This lever is slotted at its outer extremity and slidably engaging in said slot is the lower terminal of a push rod 34 mounted to reciprocate through the floor of the vehicle body 18. At its upper terminal the rod 34 is provided with a head 35 and bearing between the said head and the floor of the vehicle is a helical spring 36 surrounding the rod and normally acting to hold the rod at the limit of its upward movement for maintaining the throttle valve open. Swingingly mounted upon the vehicle body to coöperate with the upper terminal of the rod is a foot pedal 37 for depressing the rod to close the said valve.

As will now be clear, when the clutch shaft 17 is rotated, a constant and uninterrupted flow of lubricant will, since the throttle valve is normally held open, be maintained through the pump chamber 20, the lubricant entering, as previously described, through the passage 21 and discharging through the throttle valve back into the transmission case. However, by depressing the foot pedal 37 the throttle valve will be rotated toward its closed position and the flow of lubricant from the pump chamber will be accordingly checked. As a result, the lubricant will be trapped within the pump chamber to accordingly offer a resistance to the movement of the pump gears 26 and 27. Consequently, by manually releasing the clutch in the usual manner, fluid resistance may, when any one of the speed gears is in mesh, thus be communicated through the drive shaft 13 to the propeller shaft of the vehicle and accordingly brought to bear upon this latter shaft for braking the vehicle. In this connection it will, of course, be understood that the propeller shaft, which has not been shown, is connected in the usual manner to the rear terminal of the driving shaft. As will be apparent, the pressure of the fluid in the pump chamber will be increased as the rotation of the throttle valve is continued for closing the said valve, a complete check upon the flow of lubricant through the pump chamber being had when the throttle valve is closed. Consequently, the fluid pressure may be readily varied as occasion may demand for braking the vehicle accordingly. Upon the release of the foot pedal the spring 36 will act to immediately retract the push rod 34 and again shift the throttle valve to full open position for establishing uninterrupted flow of the lubricant through the pump chamber.

In connection with the throttle valve I also employ a safety valve for venting the pump chamber at a predetermined maximum pressure of the lubricant therein to consequently overcome any possibility of excessive torsion on the propeller shaft. This safety valve includes a hollow cylindrical valve plug 38 slidably mounted within a cylindrical valve chamber 39 extending horizontally through the pump case from the adjacent side edge thereof and opening, at its inner end, into the pump chamber 20 in a plane above the throttle valve. At its outer extremity the valve chamber 39 is enlarged to receive a screw plug 40 and threaded through this plug axially of the said chamber is an adjusting screw 41 held at adjustment by a lock nut 42. Bearing at one end within the valve plug 38 is a helical spring 43 having a cylindrical cap 44 fitted over its opposite end and engaged by the screw 41. The cap 44 is slidable within the valve chamber so that the screw 41 may thus be adjusted for regulating the tension of the spring 43 to urge the valve plug to closed position seating against an annular shoulder 45 formed at the inner extremity of the valve chamber. Entering through the pump case from the transmission case is a vent passage 46 communicating with the valve chamber adjacent its inner end. Consequently, it will be seen that when the fluid in the pump chamber reaches a pressure sufficient to overcome the tension of the spring 43, the valve plug 38 will be shifted outwardly away from its seat to uncover this vent passage for venting the pump chamber and permitting a flow of lubricant therethrough, through the valve chamber and vent passage back into the transmission case. Thus, possibility of breaking of the propeller shaft due to excessive torsion thereon set up by the fluid pressure in the pump chamber, will be overcome. Furthermore, it will be noted that the fluid pressure at which the pump chamber shall be vented, may be easily varied or regulated by adjusting the screw 41 to accordingly regulate or vary the tension of the spring 43 acting to hold the valve plug in closed position.

I, therefore, provide a particularly efficient service brake and a construction which may be readily employed in connection with substantially any conventional type of motor vehicle. Furthermore, the brake is of such nature that the vehicle will be gradually checked in its movement and, if desired, brought to a stand still without any likelihood of grabbing or slipping of the brake such as is now commonly experienced with the usual types of friction brakes. At the same time, all undue strain will be eliminated. Heating of the brake, such as is also now commonly experienced in connection with the usual friction brakes, will be overcome, as will also any rattling ordinarily incident to such conventional brakes, and since the lubricant of the transmission case of the vehicle is employed as a braking fluid, proper lubrication of the brake will always be insured.

Having thus described the invention, what is claimed as new is:

1. The combination with a motor vehicle transmission and clutch shaft, of a fluid brake for the vehicle including a pump case formed from a wall of the transmission case and provided with a pump chamber communicating with the transmission case, a pump gear carried by the clutch shaft and rotatable within the pump chamber, a pump gear carried by the countershaft of the transmission and mounted within the pump chamber to coöperate with the said first mentioned pump gear for normally maintaining a flow of lubricant from the transmission case through the pump chamber, the said gears being adapted to have operative connection with the propeller shaft of the vehicle, and means for checking the flow of lubricant between the pump chamber and transmission case.

2. A fluid brake for motor vehicles including a fluid chamber, a pump case having a pump chamber communicating with the fluid chamber, pumping means within the pump chamber operable to set up a flow of fluid between the chambers, means for checking such flow, the pump case being formed with a valve chamber opening into the pump chamber and provided with a vent passage communicating with the fluid chamber, a valve plug slidable within the valve chamber, yieldable means normally urging the valve plug to closed position, and means for adjustably tensioning the said yieldable means, the valve plug being shiftable to uncover said vent passage for venting the pump chamber at a predetermined fluid pressure therein.

3. The combination with a motor vehicle transmission and clutch shaft, of a fluid brake including braking fluid pumping means operable by the clutch shaft and normally free with respect to the driving shaft of the transmission but adapted to be coupled with the driving shaft when said shaft is coupled with the clutch shaft through the transmission, and means for checking the flow of fluid pumped by said means.

4. The combination with a motor vehicle transmission, of a fluid brake including co-acting braking fluid pumping means carried respectively by the clutch shaft and a shaft of the transmission and effective through the transmission when actively coupled with the clutch shaft, and means for checking the flow of said fluid.

5. In a fluid brake for motor vehicles the combination of a fluid chamber, a pump case having a pump chamber in communication with the fluid chamber, means within the pump chamber operable to set up a flow of fluid between the chambers and adapted for connection with a vehicle propeller shaft, and means for automatically venting the pump chamber whereby to prevent locking of the propeller shaft.

In testimony whereof I affix my signature.

FREDRIK G. HULTENHEIM. [L. S.]